(Model.)

W. PORTER, Jr.
LANTERN.

No. 268,936.  Patented Dec. 12, 1882.

WITNESSES:
Chas. Nida.
C. Sedgwick.

INVENTOR:
W. Porter Jr.
BY Munn & Co.
ATTORNEYS.

UNITED STATES PATENT OFFICE.

WILLIAM PORTER, JR., OF NEW YORK, N. Y.

LANTERN.

SPECIFICATION forming part of Letters Patent No. 268,936, dated December 12, 1882.

Application filed July 13, 1882. (Model.)

*To all whom it may concern:*

Be it known that I, WILLIAM PORTER, Jr., of the city, county, and State of New York, have invented certain new and useful Improvements in Lanterns, of which the following is a full, clear, and exact description.

Heretofore in the construction of lanterns the base or supporting part of the lantern has been usually secured to the bottom of the light-chamber or lantern proper by solder, forming an inwardly-projecting circular flange with which the springs of the lamp engage to hold it in place in the lantern. Lanterns thus constructed are found very defective and the solder liable to break.

To remedy this defect, and at the same time to form a stiffer internal circular flange which supports the springs of the lamp, is the object of my invention; and to these ends it consists in securing the bottom of the light-chamber to the base of the lantern by means of a three-ply flange, which more firmly secures the parts together than when solder is employed, and at the same time forms a three-ply stiff internal flange, better adapted to support the springs of the lamp than the two-ply flange ordinarily employed.

Figure 1:
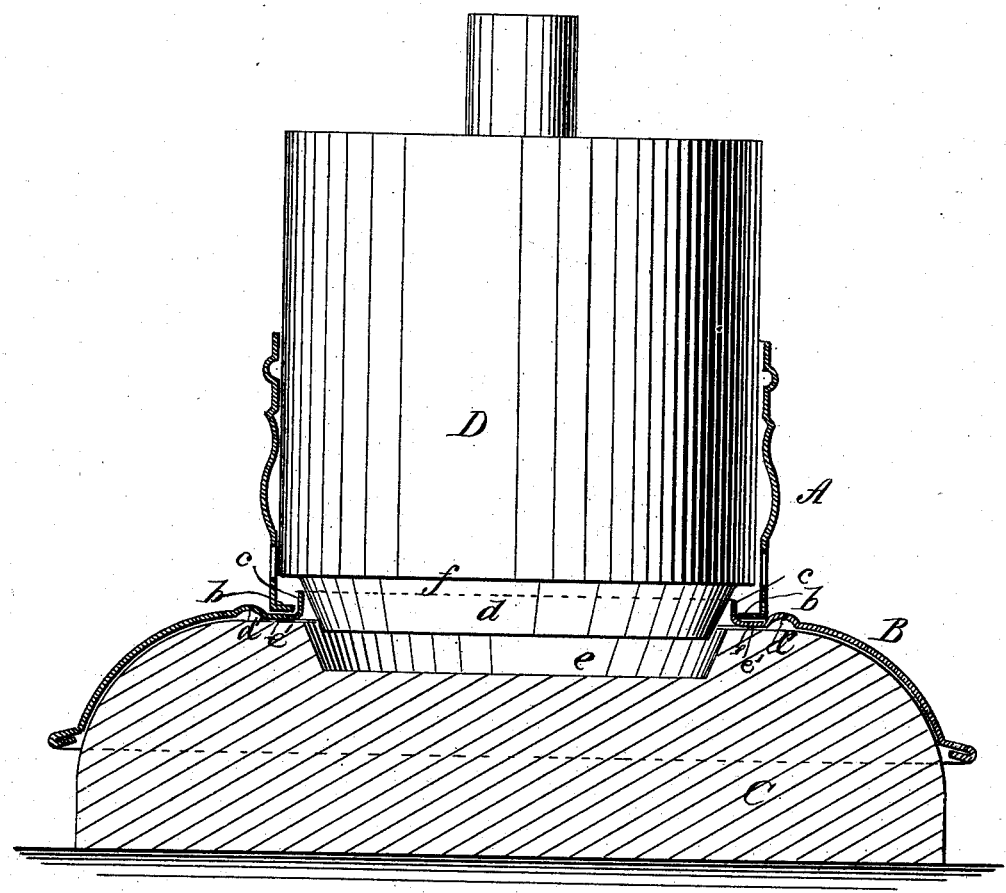
Figure 2:
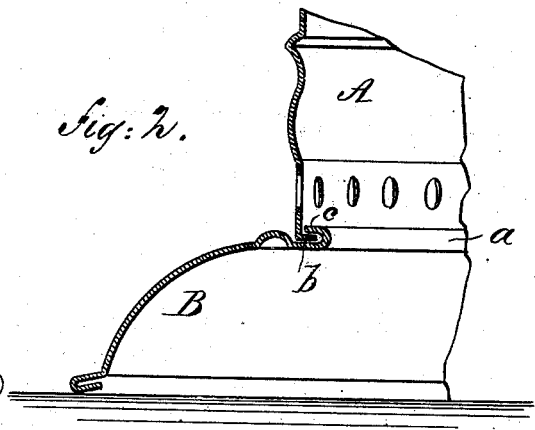

Reference is to be had to the accompanying drawings, forming part of this specification, in which Figure 1 is a sectional elevation, showing the method of forming the joint; and Fig. 2 is a detailed sectional elevation of the bottom and base of the lantern, showing these parts secured together in accordance with my invention.

A represents the metallic ring, which forms the bottom of the light-chamber or lantern proper; and B represents the base or supporting part of the lantern, provided with the usual central circular opening for the introduction of the lamp, and an annular bead, $d'$, projecting above the base and arranged near the circular edge of the opening for the introduction of the lamp, for a purpose hereinafter fully set forth.

It is a desideratum that the parts A and B should be secured together so as to form the inwardly-projecting flange $a$, with which the springs of the lamp may engage for holding the lamp in place in the lantern. In joining the parts A and B together in accordance with my invention, so as to form this inwardly-projecting flange $a$, I first bend the lower end of the bottom A so as to form the inwardly-projecting lip $b$, and then I bend the inner edge of the base B so as to form the upwardly-projecting lip $c$, which just fits within the lip $b$, as shown in Fig. 1. The lip $c$ is then folded over the lip $b$ to form the joint, as shown in Fig. 2, a seat being formed between the bead $d'$ and the flange $c$ for the reception of the flange $b$, whereby when the flange $c$ is folded over on the flange $b$ they will be securely held on the seat $e'$ by the bead $d'$, and a tight joint is formed between the ring and base. To accomplish this folding over of the lip $c$, I prefer to use the centrally-recessed anvil C and the plunger D, which are to be used as plainly indicated in Fig. 1. The lower end of the plunger is reduced in size, as shown at $d$, to form the shoulder $f$, and the reduced portion which fits in the recess $e$ of the anvil C is beveled so as to turn the upper edge of the lip $c$ outwardly before the shoulder $f$ comes in contact therewith, which puts the lip in condition to be evenly turned all around by the shoulder $f$, thus forming an even and perfect joint. In this manner it will be seen that the joint is formed of three thicknesses of metal instead of two, as heretofore, thus making the joint very strong, the flange stiffer, and the joint made cheaper, since soldering is dispensed with.

I am aware that two metallic pieces or parts have heretofore been united together by a three-ply joint, and I therefore lay no claim to such joint, broadly. In my invention a three-ply flange is formed, which subserves the double purpose of connecting the ring with the base of the lantern, and at the same time a stiffer internal flange is formed to support the springs of the lamp.

Having thus fully described my invention, what I claim as new, and desire to secure by Letters Patent, is—

As an improved article of manufacture, a lantern consisting of the base B, provided with the bead $d'$, seat $e'$, and flange $c$, and ring A, having a right-angled inwardly-projecting lip, $b$, at its bottom, the flange $c$ being folded over the lip $b$, substantially as shown and described, whereby the ring and base are firmly secured together and a stiff inwardly-projecting flange, $a$, is formed, adapted to engage with the springs of the lamp.

WILLIAM PORTER, JR.

Witnesses:
H. A. WEST,
C. SEDGWICK.